Jan. 6, 1931. J. R. DUNBECK 1,788,087
SHAKE-OUT BAIL
Filed Nov. 20, 1925
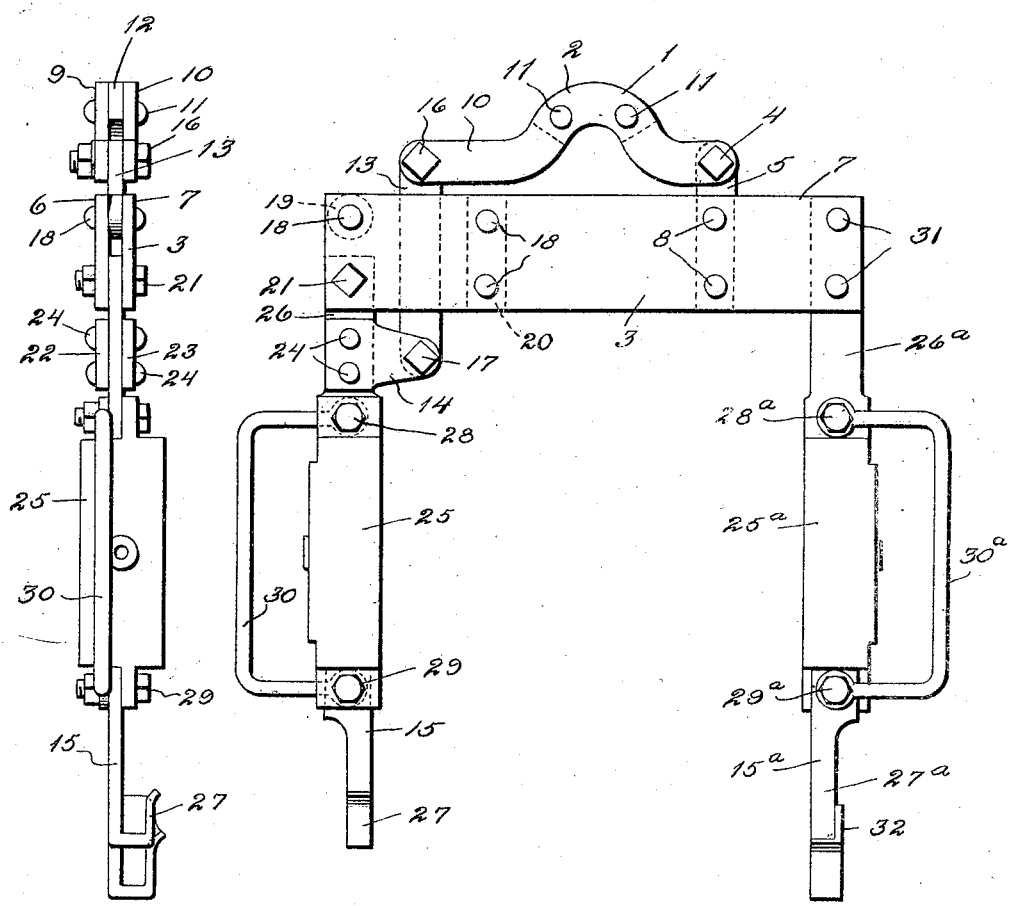

Patented Jan. 6, 1931

1,788,087

UNITED STATES PATENT OFFICE

JOSEPH R. DUNBECK, OF ROCHESTER, NEW YORK, ASSIGNOR TO THE SYMINGTON COMPANY, OF NEW YORK, N. Y., A CORPORATION OF MARYLAND

SHAKE-OUT BAIL

Application filed November 20, 1925. Serial No. 70,434.

This invention relates to bails or gripping means and more particularly to such means for holding foundry flasks or the like and vibrating the same for cleaning purposes.

The principal object of my invention, generally considered, is the provison of a shakeout bail especially adapted for holding foundry flasks and the like and so designed that it exerts a gripping action on a suspended load.

An object of my invention is the provision of a shakeout bail formed with a main supporting beam and arms depending therefrom and so connected that, when carrying a load, said arms exert a pressure towards each other on said supporting load.

Another object of my invention is the provision of a shakeout bail involving a suspension lever for supporting the same with a main supporting beam and arms depending therefrom, at least one of said arms being pivotally connected to the main supporting beam and provided with a lateral extension so connected with the suspension lever that, when a load is supported by the bail, said pivotally connected arm tends to swing toward the other arm and grip said load.

A further object of my invention is the provision of a shakeout bail formed with depending arms for gripping a load, at least one of said arms being pivoted and adapted to move toward a supported load for gripping the same and one or both of said arms being provided with a vibrating element for shaking the supported load.

Other objects and advantages of the invention relating to the particular arrangement and combination of the various parts will become apparent as the description proceeds.

Referring to the drawings illustrating my invention, the scope whereof is defined by the appended claims.

Figure 1 is a side elevation of one embodiment of my shakeout bail.

Figure 2 is an end view of the same.

Considering the drawings in detail, like parts being designated by like reference characters, the preferred embodiment of my invention illustrated comprises a suspension lever 1 formed with a curved intermediate portion 2 for receiving a hook or other means for supporting the bail. One end of the suspension lever 1 is pivotally connected to a main supporting beam 3 by means of a bolt or other connecting means 4 extending through a connecting link 5, the lower end of which is rigidly connected between the plates 6 and 7 of the beam 3 by means of a plurality of rivets or other connecting means 8. The connecting link 5 preferably extends between the plates 6 and 7 and the suspension lever 1 is preferably formed as a plurality of plates 9 and 10 connected together adjacent the curved portion 2 thereof by means of a plurality of rivets or the like 11 and preferably provided with a filler member 12 through which said connecting means extend. One end of the suspension lever 1 preferably embraces the adjacent end of the connecting link 5 and the other end preferably embraces the adjacent end of a link or connecting rod 13 extending between the plates 6 and 7 of the main supporting beam 3 and connected at its lower end with a lateral or inward extension 14 formed on the depending arm 15. The connecting means 13 is preferably connected at its upper end with the suspension lever 1 by means of a bolt or the like 16 and at its lower end is similarly connected with the lateral extension 14 by means of a bolt or the like 17.

For properly spacing the ends of the plates 6 and 7 adjacent the member 13, said plates are preferably connected together by rivets or the like 18 with a plurality of spacers or fillers 19 and 20 between the plates and through which said connecting means extend.

The depending arm 15 is preferably pivotally connected to the main supporting beam 3 by having its upper end embraced between the plates 6 and 7 thereof and pivoted thereto by means of a connecting bolt or the like 21. The lateral extension 14 is preferably formed as two plates 22 and 23 connected on opposite sides of the arm 15 by means of rivets or the like 24 and formed with their opposite ends like 24 and formed with their opposite ends positioned on opposite sides of the connecting member 13, said opposite ends preferably extending inwardly or toward the opposite end of the main supporting beam 3.

The pivoted arm 15 preferably comprises a vibrator or vibrating element 25 bolted or otherwise connected at its upper end to the upper section or plate 26 of the arm 15 and having connected at its lower end a hook or other foundry flask holding member 27. The connection between the vibrator 25 and the plate 26 preferably consists of a bolt 28 and the connection between the vibrator 25 and the hook 27 likewise consists of a bolt 29, said bolts 28 and 29 also preferably serving for the connection of a U-shaped rod or grab iron 30 to the depending arm 15.

The other arm 15ª may be constructed and connected to the main supporting beam 3 in a manner similar to that of the arm 15. In the embodiment illustrated, however, the arm 15ª is merely rigidly connected to the opposite end of the main supporting beam 3 between the plates 6 and 7 thereof by a plurality of rivets or other connecting means 31. Between the upper section or plate 26ª of said arm 15ª and the lower section or hook-shaped portion 27ª may be provided a vibrator or vibrating element 25ª as for the pivoted arm 15. The respective connections between said elements 26ª, 27ª and 25ª are provided by bolts or the like 28ª and 29ª which, as in connection with the pivoted arm, also serve for connecting a U-shaped member or grab iron 30ª.

As illustrated, the lower or hook-shaped portion 27ª may be formed slightly different, if desired, from the hook 27. That is, said hook 27ª is formed with an outwardly disposed web 32 extending between the hook end of the member 27ª and the adjacent shank portion thereof so as to better provide for gripping a projection or stud of a foundry flask or other object supported by said bail. The arms 15 and 15ª in the present embodiment are shown of different lengths, but this is not essential to my invention.

The operation of the aforedescribed apparatus is as follows. The bail, as illustrated, is connected to a foundry flask or the like by applying the hooks 27 and 27ª around projections or studs from said article and engaging a crane hook or other lifting means with the curved portion 2 of the suspension lever 1 to thereby lift the connected object. When this has been accomplished, as will be obvious, the pivoted arm 15 tends to swing inwardly or toward the rigid arm 15ª and grip the foundry flask or other object between said arms by virtue of the connection 13 between the free end of the suspension lever 1 and the lateral extension 14 from the pivoted arm 15. A similar effect would take place if the arm 15ª were constructed and connected similarly to the arm 15 so that the shakeout bail acts like a pair of tongs or ice-hooks for gripping a suspended object. Such a result, as will be obvious, is very desirable in that it prevents undesired disengagement between the supported object and the hooks 27 and 27ª when the vibrators or vibrating elements 25 or 25ª or both of them are set in operation by admitting compressed air or other suitable source of power thereto. Although the construction of the vibrating elements is not of the essence of the invention, I may use one of the approved types on the market or such as disclosed in the Stoney and Purwin Patent No. 1,447,694 of March 6, 1923, if desired.

Having now described my invention, what I claim is:

1. A lifting device comprising a suspension lever, a main supporting beam connected to said lever and arms depending therefrom, said arms being provided with attaching means, one of said arms being movably connected to the beam, and a link connecting said movable arm to said lever so as to exert a gripping action on a supported article.

2. A lifting device comprising a suspension lever, a main supporting beam connected to said lever and arms depending therefrom, said arms being provided with hooks at their lower ends, one of said arms being movably connected to said lever so as to exert pressure toward the other on a suspended load.

3. A lifting device comprising a main supporting beam and arms depending therefrom, a suspension lever pivotally mounted above said beam, said arms being provided with attaching means and one of them movably connected to the beam and to the lever so as to exert pressure toward each other on a suspended load.

4. A lifting device comprising a main supporting beam and arms depending therefrom, a suspension lever pivotally mounted on said beam, said arms being provided with attaching means and one of them movably mounted and connected to said lever so that they exert pressure toward each other on a suspended load.

5. A lifting device comprising a main supporting beam and arms depending therefrom, said arms being provided with attaching means, one of said arms being rigid with and the other pivoted to the supporting beam, said pivoted arm being provided with a lateral extension and a connection between said extension and said main beam whereby when a load is applied, said arm tends to swing toward the other arm.

6. A shakeout bail comprising a suspension lever, a main supporting beam connected to said lever, arms depending from said beam and means connecting one portion of the lever to the beam and means pivoting another portion to an arm so that said arms exert a gripping action on a supported article.

7. A shakeout bail comprising a suspension lever for supporting the same, a main supporting beam, and arms depending therefrom, one of said arms being rigid with and the other pivoted to said main supporting beam, said pivoted arm being connected to said suspension lever so that when a load is carried by said arms a gripping action is exerted thereon.

8. A shakeout bail comprising a suspension lever, a main supporting beam connected thereto, and arms depending from said beam, one of said arms being pivotally connected to said beam and provided with a projection extending toward the other arm and a link connecting said projection and the lever.

9. A shakeout bail comprising a suspension lever, a main supporting beam connected thereto, and arms depending from said beam, one of said arms being pivotally connected to said beam and formed with a lateral projection extending toward the other arm, a connection between said projection and one end of the lever and a connection between the other end of the lever and the beam.

In testimony whereof I affix my signature.

JOSEPH R. DUNBECK.